United States Patent
Johnson et al.

(12)

(10) Patent No.: US 6,305,222 B1
(45) Date of Patent: Oct. 23, 2001

(54) ROAD VIBRATION COMPENSATED ANGULAR RATE SENSOR

(75) Inventors: Jack Daniel Johnson, Russiaville; Seyed Ramezan Zarabadi, Kokomo, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/321,449

(22) Filed: May 27, 1999

(51) Int. Cl.[7] ............................. G01P 3/00; G01C 19/00
(52) U.S. Cl. ................................. 73/504.12; 73/504.18
(58) Field of Search .................................. 73/1.37, 1.38, 73/504.02, 504.04, 504.08, 504.12, 504.18, 504.13

(56) References Cited

U.S. PATENT DOCUMENTS

| | | | |
|---|---|---|---|
| 5,383,362 | * 1/1995 | Putty et al. | 73/505 |
| 5,450,751 | 9/1995 | Putty et al. | 73/504.18 |
| 5,540,094 | * 7/1996 | Varnham et al. | 73/504.13 |
| 5,547,093 | 8/1996 | Sparks | 216/2 |
| 5,623,098 | 4/1997 | Castleman et al. | 73/497 |
| 5,652,374 | 7/1997 | Chia et al. | 73/1.38 |
| 5,872,313 | 2/1999 | Zarabadi et al. | 73/497 |

* cited by examiner

Primary Examiner—Helen Kwok
(74) Attorney, Agent, or Firm—Jimmy L. Funke

(57) ABSTRACT

A motion sensor (10) includes a micromachined sensing structure and a number of capacitive electrodes (20) disposed about a periphery thereof. The sensing structure includes a ring (14) supported above a substrate (12) so as to have an axis of rotation normal to the substrate (12), and a number of springs (16) attached to a post (18) positioned at the center of the ring (14). Certain diametrically opposed ones of the capacitive electrodes (20) are configured as drive electrodes (20*a*), and other diametrically opposed ones of the capacitive electrodes (20), positioned 90 degrees relative to the corresponding drive electrodes (20*a*) are configured as sense electrodes (20*b*). Signals produced at the opposed sense electrodes (20*b*) are conditioned and coupled to a common input of an amplifier circuit (64,70). With the configuration of the drive (20*a*) and sense (20*b*) electrodes and supporting circuitry (60–70), the resulting sensor (10) is operable to reject the effects of linear forces thereupon due to road vibrational effects.

20 Claims, 3 Drawing Sheets

ROAD VIBRATION COMPENSATED ANGULAR RATE SENSOR

TECHNICAL FIELD

The present invention relates generally to semiconductor sensing devices, and more specifically to compensation techniques for permitting controlled levels of vibration in such sensors while rejecting road vibration.

BACKGROUND OF THE INVENTION

Motion sensors have been widely used in a variety of applications including automotive control systems. Examples of such automotive applications include anti-lock brake systems, active suspension systems, active occupant restraint systems such as air bags and the like, and vehicle impact sensing systems, to name a few. In any of the foregoing systems, angular rate sensors are generally used to sense rotation of an automobile while accelerometers are generally used to sense acceleration/deceleration of an automobile.

In the past, electromechanical and electronic motion sensors or accelerometers have been used in automotive applications to detect automobile acceleration/deceleration. More recently, sensors that employ an electrically-conductive, micromachined plated metal or silicon sensing element have been developed which can be integrated with known semiconductor wafer processing techniques such as, for example, bipolar, CMOS, and BiCMOS processes. An example of a plated metal surface micromachined sensor is disclosed in U.S. Pat. No. 5,450,751 to Putty et al. which is assigned to the assignee of the present invention, and the contents of which are incorporated herein by reference. The Putty et al. device is formed in accordance with a metal plating technique in co-operation with a mold that defines a resonating ring and spring system affixed to the surface of a wafer. One variation of the Putty et al. sensor is disclosed in U.S. Pat. No. 5,547,093 to Sparks, which is also assigned to the assignee of the present invention and which is also incorporated herein by reference. The Sparks device is an electrically-conductive, micromachined silicon sensing element that is formed by etching a "sensing" chip from a single-crystal silicon wafer or polysilicon film on a silicon or glass carrier.

The Putty et al. and Sparks sensors each include a number of capacitive sites disposed about the perimeter of the ring structure, wherein the various capacitive sites serve as electrode interfaces to the sensor. Conductive runners on the sensing chip enable the electrodes to be electrically interconnected with appropriate signal conditioning circuitry and to provide a biasing voltage to the ring. In operation, some of the electrodes serve as "drive" electrodes that drive the ring to resonate when these electrodes are appropriately energized. Other electrodes serve as "balance" electrodes that, when energize, serve to balance the resonant peaks of the flexural movement of the ring by changing the electromechanical stiffness of the ring and springs. Still other electrodes serve as "sensing" electrodes that capacitively sense the proximity of the ring relative to these sensing electrodes. With the foregoing construction, the sensor is able to detect movement of the ring vibrational pattern toward and away from the sensing electrodes, which occurs in response to the angular velocity of the ring about its axis of rotation due to effects of the Coriolis force. Thus, when appropriately installed, the sensor is operable to sense rotation rate about any chosen axis of an automobile.

Sensors of the type just described are capable of precise measurements and are therefore desirable for use in automotive applications. However, the operation of such sensors can be adversely affected by certain environmental operating conditions as well as certain external stimuli. For example, a sufficiently large gap must exist between the electrodes and the sensing element ring to prevent shorting, yet this gap must also be sufficiently small to maximize the capacitive output signal of the sensor. Temperature sensitivities exist due to the narrowness of the gap required between the ring and the sensor's drive, balance and sense electrodes, the effects of which are compounded by the large length ratios between the ring and the electrode structures. The natural frequency of the ring is also affected by temperature, which can impact the scale factor response of the ring at resonance. U.S. Pat. No. 5,872,313 to Zarabadi et al., which is assigned to the assignee of the present invention and the disclosure of which is incorporated herein by reference, discloses a variation of the Putty et al. and Sparks sensor wherein the electrode structures are configured to reduce the sensitivity of the sensor to temperature variations.

As an example of the adverse affects of certain external stimuli on sensor operation, it is paramount that the level of vibration on the sensing element of the type just described be controlled while rejecting unwanted sources of vibration such as, for example, road vibration. Heretofore, typical road vibration rejection strategies involved the design and implementation of shock-absorbing sensor mounting structures. However, such mounting structures are generally bulky and expensive to implement. What is therefore needed is a technique for electronically compensating a ring-type angular rate sensor, as this type of sensor is described hereinabove, to thereby reject unwanted road vibrational effects.

SUMMARY OF THE INVENTION

The foregoing drawbacks of prior art motion sensors are addressed by the present invention. In accordance with one aspect of the present invention, a motion sensor comprises a sensing ring supported by a substrate, a first pair of diametrically opposed drive electrode structures defined on the substrate about the ring and defining a first axis therethrough, wherein the first pair of diametrically opposed drive electrode structures are adapted to receive sensor drive signals thereat, a first pair of diametrically opposed sense electrode structures defined on the substrate about the ring and defining a second axis therethrough normal to the first axis, and a first amplifier having an input coupled to each of the first pair of diametrically opposed sense electrode structures and an output defining a first output of the motion sensor.

In accordance with another aspect of the present invention, a motion sensor comprises a sensing ring supported by a substrate, a first pair of diametrically opposed drive electrode structures defined on the substrate about the ring and defining a first axis therethrough, wherein the first pair of diametrically opposed drive electrode structures are adapted to receive sensor drive signals thereat, a number of sense electrode structures defined on the substrate about the ring, and a first amplifier having an input coupled to at least some of the number of sense electrode structures and an output defining a first output of the motion sensor.

In accordance with a further aspect of the present invention, a method of minimizing road vibrational effects in a motion sensor having a sensing ring supported by a substrate and a number of electrode structures defined on the substrate about the ring, comprises the steps of configuring a first pair of diametrically opposed ones of the electrode structures as a first pair of drive electrodes adapted to receive sensor drive signals thereat, configuring a second pair of diametrically opposed ones of the electrode structures as a first pair of sense electrodes, wherein the first pair of sense electrodes define a first axis therethrough normal to a second axis defined through the first pair of drive electrodes, and summing sense signals produced by the first pair of sense electrodes at a first output of the motion sensor.

One object of the present invention is to provide an improved motion sensor that is insensitive to road vibrational effects without requiring anti-shock or anti-vibration sensor mounting hardware.

Another object of the present invention is to provide such an improved motion sensor that achieves road vibrational insensitivity via strategic placement of capacitive electrode pickoffs and strategic summing of sensor output signals.

These and other objects of the present invention will become more apparent from the following description of the preferred embodiment.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
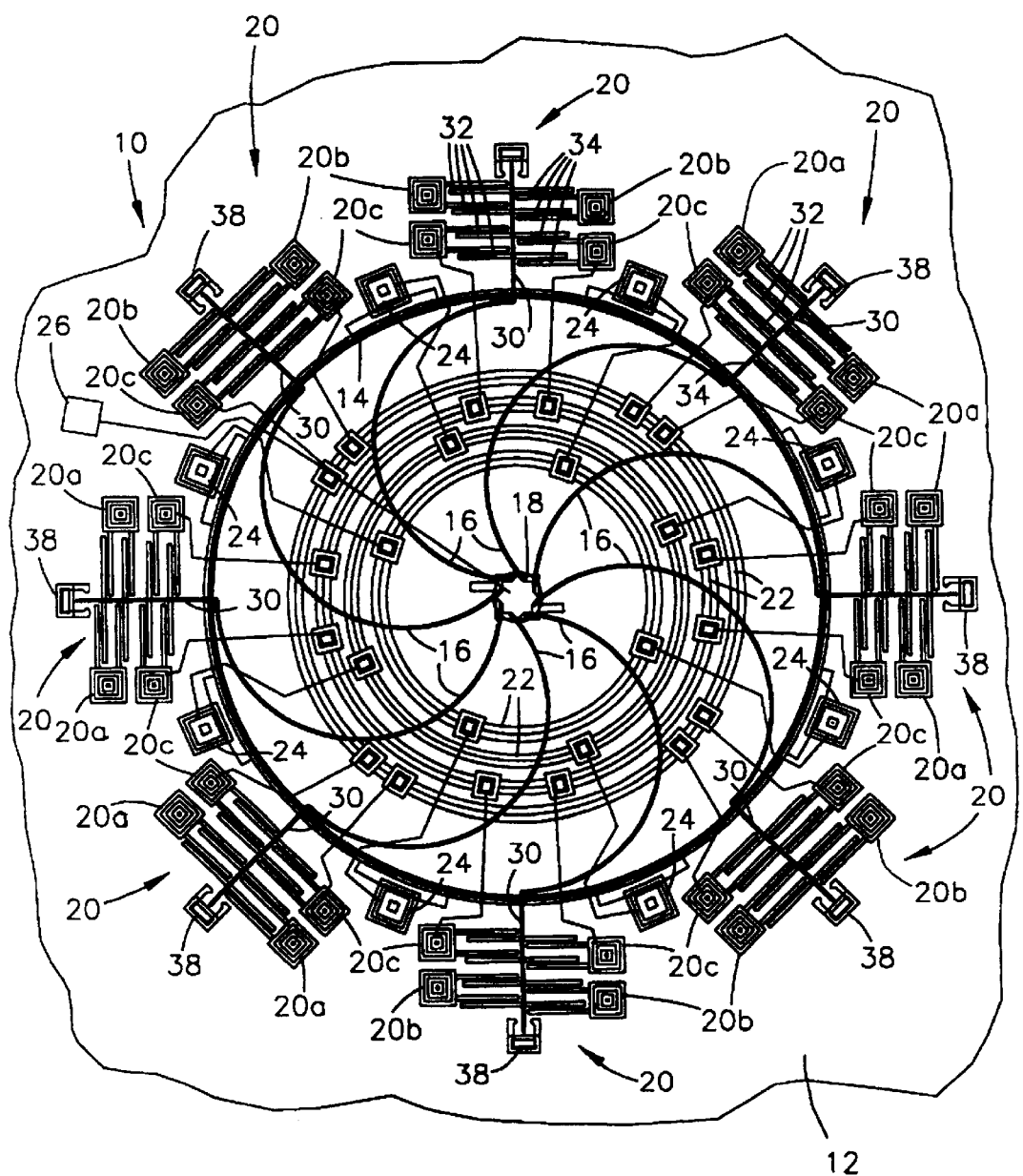
FIG. 1 is a top plan view of one preferred embodiment of an angular rate motion sensor, in accordance with the present invention.

Referring now to FIG. 1, one preferred embodiment of a motion sensor 10, in accordance with the present invention, is shown. While sensor 10 will be described herein as being an angular rate motion sensor in particular, those skilled in the art will recognize that the sensor 10 is also capable of operation as an acceleration sensor. As illustrated in FIG. 1, the sensor 10 includes a sensing element formed on a sensing wafer 12. The sensing element includes a ring 14 that is supported by a number of arcuate springs 16 radially extending from a center hub or post 18. The ring 14, springs 16 and post 18 may be an all-silicon monolithic structure such as that described by Sparks (U.S. Pat. No. 5,547,093), which is incorporated herein by reference, or a plated metal surface micromachined structure such as that described by Putty et al., which is also incorporated herein by reference.

As shown in FIG. 1, the ring 14 is surrounded by a number of electrode structures 20 formed on the wafer 12. In the diagram, the electrode structures 20 form an equi-angularly spaced electrode pattern in close proximity to the perimeter of the ring 14. The ring 14 and the electrodes 20 are formed to be electrically conductive, thereby enabling certain features of the ring 14 to form capacitors with each of the electrode structures 20 when a voltage potential is present. In accordance with the present invention, certain ones of the electrode structures 20 are configured as "drive" electrodes 20a that drive the ring 14 into resonance when energized, while certain others of the electrode structures 20 are configured as "sense" electrodes 20b to capacitively sense the proximity of the ring 14, which will vary due to the Coriolis forces that occur when the ring is subjected to rotary motion. Each of the electrode structures 20 are also configured to include balance electrodes 20c that, when energized, balance the resonant peaks of the rotary movement of the ring 14 by inducing stiffness in the ring 14 and springs 16. The balance electrodes 20c are shown in FIG. 1 as being radially inward from the drive and sensing electrodes 20a and 20b, and are electrically interconnected to concentric conductors 22 located beneath the ring 14 on the wafer 12. Also shown in FIG. 1 are additional balance electrodes 24 disposed equi-angularly around the perimeter of the ring 14, which serve to fine balance the sensing structure. For this purpose, these electrodes 24 are capacitively coupled to the ring 14 and electrically interconnected with some of the concentric conductors 22, as shown. The ring 14, springs 16 and post 18 are electrically insulated from the wafer 12, and electrically interconnected to a conductor 26 outside the ring 14 so as to allow an appropriate electrical potential to be established between the sensing structure and the electrodes 20a, 20b, 20c and 24.

With the foregoing construction, the sensor 10 is able to detect angular velocity about the vertical axis of the ring 14 and, accordingly, rotary movement about an axis of a body, such as an automobile, to which the sensor 10 is mounted. In general, the performance of the sensor 10 is optimized by equi-angularly locating the electrode structures 20 about the periphery of ring 14, and the performance of the sensor 10 is generally enhanced by increasing the number of sensing electrodes 20b present. In any case, however, the symmetry of ring 14 is essential for its proper operation.

As shown in FIG. 1, one preferred embodiment of the electrode structure 20 is shown, although the present invention contemplates alternate configurations of electrode structure 20. In the embodiment illustrated in FIG. 1, each of the electrode structures 20 includes a base 30 that extends radially from the ring 14, with multiple teeth 32 extending away from the base 30. Because the base 30 and teeth 32 are physically connected to ring 14, and preferably formed integral with the ring 14, the base 30 and teeth 32 will be subjected to the same physical movement as the ring 14. A stop 38 is included for limiting the lateral movement of the base 30, and therefore prevents the teeth 32 from contacting the surrounding electrode structure 20 due to excessive angular and/or linear acceleration of the ring 14. Each electrode structure 20 also includes an arrangement of teeth 34 that are interdigitized with the teeth 32. The teeth 34 are attached to the wafer 12, and are preferably integral therewith, and are therefore not subjected to the same physical movement as that of the ring 14, base 30 and teeth 32. The resulting electrostatic forces between teeth 32 and teeth 34 govern the performance of the drive, sense, and balance electrodes 20a–c.

Figure 2:
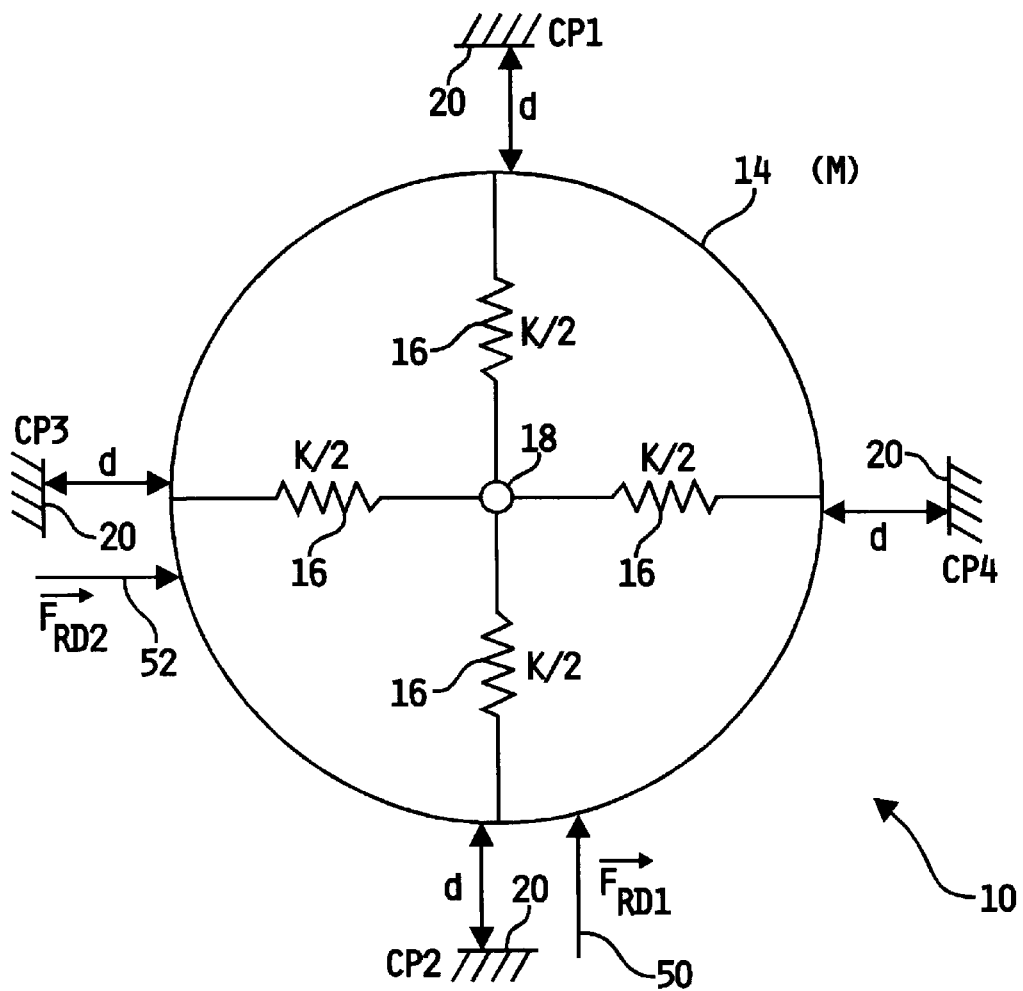
FIG. 2 a schematic diagram of a linear mass-spring model of the angular rate motion sensor of FIG. 1, in accordance with the present invention.

In accordance with the present invention, the drive electrodes 20a and sense electrodes 20b are strategically located about the periphery of ring 14, as shown in FIG. 1, so as to compensate for road vibrational effects on the sensor 10 and accordingly minimize any such road vibrational effects, when sensor 10 is mounted within a vehicle. Generally, road vibration imparts a linear force onto sensor 10, thereby resulting in a linear acceleration detected by sensor 10. To facilitate an understanding of the effects of road vibration on sensor 10, a linear mass-spring model of sensor 10 is thus illustrated in FIG. 2. Referring to FIG. 2, a linear mass-spring model of sensor 10 comprises a stiff ring 14 of mass "M" attached at center post 18 by a number of springs 16 having spring constants of K/2. About the periphery of ring 14, a number of capacitive electrodes (CP1–4) 20 are each located a distance "d" from ring 14. Only four such springs 16 and electrodes 20 are shown in FIG. 2 for ease of illustration, and it should be understood that sensor 10 may include any number of springs 16 and electrodes 20, wherein the number of springs 16 generally corresponds to the number of electrodes 20 disposed about the periphery of ring 14. For example, in the sensor embodiment illustrated in FIGS. 1 and 3, sensor 10 includes eight such springs 16 and eight such electrodes 20. In either case, if a linear force $F_{RD1}$ 50 or $F_{RD2}$ 52 is imparted to ring 14 due to road vibration, either such linear force $F_{RD}$ is defined by the equation $F_{RD}=M*a_{RD}$, where $a_{RD}$ is the road vibration-induced linear acceleration. The resulting displacement of the ring 14 is defined as $\Delta d$, where $\Delta d = F_{RD}/K$.

The displacement of the ring 14 due to the force $F_{RD1}$ 50 or $F_{RD2}$ 52 results in a change in capacitance $\Delta C$ of the electrodes positioned parallel to the applied force. Thus, for example, if road vibration results in a force $F_{RD1}$ 50 applied to ring 14, electrodes CP1 and CP2 will experience a resulting change in capacitance $\Delta C$, whereas if the road vibration results in a force $F_{RD2}$ 52 applied to ring 14, electrodes CP3 and CP4 will experience a resulting change in capacitance $\Delta C$. In either case, the change in capacitance $\Delta C$ seen by any electrode 20 due to a linear force acting thereupon is defined by the equation $\Delta C = [e*A*\Delta d/d^2] - [e*A*\Delta d/(d\pm\Delta d)^2]$, where $e$ is the permitivity of free space and A is the area of the capacitive plate defined by the corresponding electrode 20.

Figure 3:
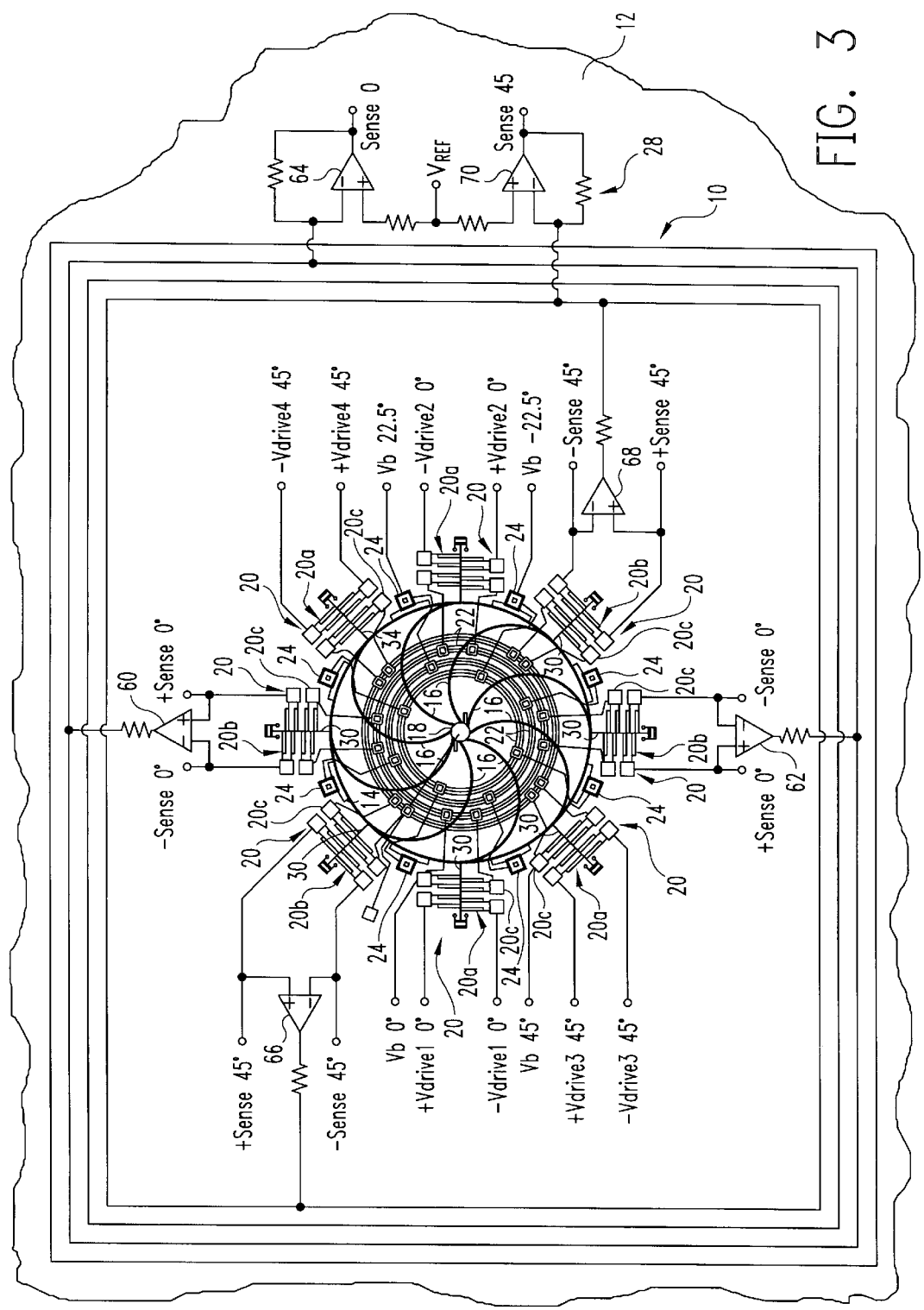
FIG. 3 is a schematic diagram of one preferred embodiment of electronic interface circuitry for the angular rate motion sensor of FIG. 1, in accordance with the present invention, for compensating for road vibrational effects thereon.

Referring now to FIG. 3, one preferred embodiment of sensor 10 including compensation electronics for minimizing road vibrational effects thereon, in accordance with the present invention, is shown. In the embodiment shown in FIG. 3, matching drive electrodes 20a are preferably disposed on opposite sides of ring 14 along a common axis while corresponding sense electrodes 20b are also disposed on opposite sides of ring 14 along a common axis, wherein the sense electrodes 20b are located 90 degrees from the drive electrodes 20a. Preferably, two such sets of drive electrode/sense electrode pairs are positioned about the periphery of ring 14, wherein the two sets of drive electrode/sense electrode pairs are displaced by approximately 45 degrees relative to each other. For example, in the embodiment illustrated in FIG. 3, drive electrodes ±Vdrive1 and ±Vdrive2 are located at 180 degrees and zero degrees respectively relative to a horizontal axis defined through sensor 10, while sense electrodes ±Sense 0 are located at ±90 degrees respectively relative to horizontal. The Sense 0 electrode located at ±90 degrees is connected to an operational amplifier 60, and the Sense 0 electrode located at –90 degrees is connected to another operational amplifier 62, wherein the outputs of amplifiers 60 and 62 are coupled to an inverting input of an amplifier 64 having a non-inverting input connected to a reference potential $V_{REF}$. The output of amplifier 64 defines a "Sense 0" output of sensor 10. Drive electrodes ±Vdrive3 and ±Vdrive4 are likewise located at –135 degrees and +45 degrees respectively relative to horizontal, while sense electrodes ±Sense 45 are located at +135 degrees and –45 degrees respectively relative to horizontal. The Sense 45 electrode located at +135 degrees is connected to an operational amplifier 66, and the Sense 45 electrode located at –45 degrees is connected to another operational amplifier 68, wherein the outputs of amplifiers 66 and 68 are coupled to an inverting input of an amplifier 70 having a non-inverting input connected to reference potential $V_{REF}$. The output of amplifier 70 defines a "Sense 45" output of sensor 10.

Preferably, amplifiers 60–70 and any intermediate electrical components are integrated onto the wafer 12 using known wafer processing techniques. It is to be understood, however, that such amplifiers and components may alternatively be fabricated and attached to sensor in accordance with any known technique. In one preferred embodiment, amplifiers 60–70 are low input capacitance operational amplifiers of the type described in U.S. Pat. No. 5,491,443 to Zarabadi, which is assigned to the assignee of the present invention and the contents of which are incorporated herein by reference. It is to be understood, however, that the present invention contemplates using other known amplifier structures as amplifiers 60–70.

With the aid of FIGS. 2 and 3, the operation of sensor 10 and road vibration minimizing electrical components will now be described in detail. With a suitable voltage impressed upon ring 14 (via Vb 0, Vb 45, Vb 22.5 and Vb –22.5), and assuming that sensor 10 is mounted within a vehicle such that road vibration exerts force $F_{RD1}$ 50 (see FIG. 2) thereon, the change in output voltage $\Delta$VOUT at each of the amplifiers 60 and 62 is defined by the equation $\Delta VOUT = |[(Vb-V_{IN})*\Delta C]/(C+\Delta C)|$, where Vb is the voltage on ring 14, $V_{IN}$ is the differential voltage seen at the input either amplifier 60 or 62, C is the electrode capacitance and $\Delta C$ is the change in electrode capacitance as defined hereinabove. It should be noted, however, that the due to the diametrically opposite positioning of the Sense 0 electrodes 20b, the force $F_{RD1}$ 50 due to the road vibration results in equal and opposite $\Delta$VOUT values produced by amplifiers 60 and 62. Since the outputs of amplifiers 60 and 62 are each connected to a common input of amplifier 64, these equal and opposite $\Delta$VOUT values cancel each other, thereby resulting in rejection of the effects of linear motion due to $F_{RD1}$ 50. It will be apparent to those skilled in the art that a force $F_{RD1}$ 50 in the opposite direction to that shown in FIG. 2 is subject to an identical analysis and, and the effects of such a linear force will be cancelled in the embodiment illustrated in FIG. 3 as just described with respect to force $F_{RD1}$ 50.

Now assuming that sensor 10 is mounted within a vehicle such that road vibration exerts a force $F_{RD2}$ 52 (see FIG. 2) thereon, the change in drive voltage $\Delta$VDR at ±Vdrive1 and ±Vdrive2 is defined by the equation $\Delta VDR = |[(Vb-V_{DR})*\Delta C]/(C+\Delta C)|$, where Vb is the voltage on ring 14, $V_{DR}$ is the differential voltage seen at either drive electrode Vdrive1 or Vdrive2, C is the electrode capacitance and $\Delta C$ is the change in electrode capacitance as defined hereinabove. As with the previous case, it should be noted that the due to the diametrically opposite positioning of the Vdrive1 and Vdrive2 electrodes 20a, the force $F_{RD2}$ 52 due to the road vibration results in equal and opposite $\Delta$VDR values. The output, Sense 0, of the amplifier 64 is a function of a number of factors including the drive voltages Vdrive1 and Vdrive2, amplifier gain (G) and the total gain response f(r) of the sensor 10, and can be represented for the purposes of the subject invention as Sense 0=G* VDR*f(r), where VDR is the sum of Vdrive1 and Vdrive2. In the case of an applied force $F_{RD2}$ 52, VDR=(Vdrive1+$\Delta$VDR+Vdrive2–$\Delta$VDR). From the foregoing, it can thus be seen that an applied linear force $F_{RD2}$ 52 will result in equal and opposite $\Delta$VDR values that cancel each other due to the strategic positioning of the drive electrodes Vdrive1 and Vdrive2 20a. It will be apparent to those skilled in the art that a force $F_{RD2}$ 52 in the opposite direction to that shown in FIG. 2 is subject to an identical analysis and, and the effects of such a linear force will be cancelled in the embodiment illustrated in FIG. 3 as just described with respect to force $F_{RD2}$ 52.

As shown in FIGS. 1 and 3, and as described hereinabove, sensor 10 further includes an identical set of diametrically opposed drive electrode and sense electrode pairs positioned 45 degrees relative to those just discussed. Any diagonal force (i.e. ±45 degrees and/or ±135 degrees) will accordingly be cancelled using the same analysis described hereinabove.

It should now be apparent that the sensor 10 and road vibration minimizing components of FIG. 3 are operable to completely cancel effects of linear acceleration in any on-axis direction (i.e. 0, 90, 180 and −90 degrees) as well as linear acceleration in any direction diagonal thereto. For linear acceleration in any other direction, those skilled in the art will recognize that any effects thereof will be minimized but not completely cancelled. It should also be apparent that the accuracy and resolution of linear acceleration cancellation is directly dependent upon the number of drive electrodes 20a and sense electrodes 20b positioned about the periphery of ring 14, and that the number of drive and sense electrodes 20a and 20b respectively may be chosen to effectuate a desired sensitivity, accuracy and resolution of linear acceleration cancellation.

While the invention has been illustrated and described in detail in the foregoing drawings and description, the same is to be considered as illustrative and not restrictive in character, it being understood that only the preferred embodiments have been shown and described and that any changes and modifications that come within the spirit of the invention are desired to be protected.

What is claimed is:

1. A motion sensor comprising:
   a sensing ring supported by a substrate;
   a first pair of diametrically opposed drive electrode structures defined on said substrate about said ring and defining a first axis therethrough, said first pair of diametrically opposed drive electrode structures adapted to receive sensor drive signals thereat;
   a first pair of diametrically opposed sense electrode structures defined on said substrate about said ring and defining a second axis therethrough normal to said first axis; and
   a first amplifier having an input coupled to each of said first pair of diametrically opposed sense electrode structures and an output defining a first output of said motion sensor.

2. The motion sensor of claim 1 wherein said first pair of drive electrode structures and said first pair of sense electrode structures are integrated into said substrate.

3. The motion sensor of claim 1 wherein said first pair of drive electrode structures and said first pair of sense electrode structures are disposed on said substrate.

4. The motion sensor of claim 1 further including:
   a second amplifier receiving a differential sense signal from one of said first pair of sense electrode structures and producing a first single ended sense signal at an output thereof; and
   a third amplifier receiving a differential sense signal from the other of said first pair of sense electrode structures and producing a second single ended sense signal at an output thereof;
   and wherein said outputs of said second and third amplifiers are connected to said input of said first amplifier.

5. The motion sensor of claim 4 wherein said first, second and third amplifiers are integrated into said substrate.

6. The motion sensor of claim 4 wherein said first, second and third amplifiers are disposed on said substrate.

7. The motion sensor of claim 4 wherein said first, second and third amplifiers are low input capacitance operational amplifiers.

8. The motion sensor of claim 1 further including:
   a second pair of diametrically opposed drive electrode structures defined on said substrate about said ring and defining a third axis therethrough, said second pair of diametrically opposed drive electrode structures adapted to receive sensor drive signals thereat;
   a second pair of diametrically opposed sense electrode structures defined on said substrate about said ring and defining a fourth axis therethrough normal to said third axis; and
   a second amplifier having an input coupled to each of said second pair of diametrically opposed sense electrode structures and an output defining a second output of said motion sensor.

9. The motion sensor of claim 8 wherein said third axis is displaced from said first axis by approximately 45 degrees.

10. The motion sensor of claim 8 further including:
    a third amplifier receiving a differential sense signal from one of said first pair of sense electrode structures and producing a first single ended sense signal at an output thereof;
    a fourth amplifier receiving a differential sense signal from the other of said first pair of sense electrode structures and producing a second single ended sense signal at an output thereof;
    a fifth amplifier receiving a differential sense signal from one of said second pair of sense electrode structures and producing a third single ended sense signal at an output thereof;
    a sixth amplifier receiving a differential sense signal from the other of said second pair of sense electrode structures and producing a fourth single ended sense signal at an output thereof;
    and wherein said outputs of said third and fourth amplifiers are connected to said input of said first amplifier, and said outputs of said fifth and sixth amplifiers are connected to said input of said second amplifier.

11. The motion sensor of claim 10 wherein said first, second, third, fourth, fifth and sixth amplifiers are integrated into said substrate.

12. The motion sensor of claim 10 wherein said first, second, third, fourth, fifth and sixth amplifiers are disposed on said substrate.

13. The motion sensor of claim 10 wherein said first, second, third, fourth, fifth and sixth amplifiers are low input capacitance operational amplifiers.

14. A motion sensor comprising:
    a sensing ring supported by a substrate;
    a first pair of diametrically opposed drive electrode structures defined on said substrate about said ring and defining a first axis therethrough, said first pair of diametrically opposed drive electrode structures adapted to receive sensor drive signals thereat;
    a number of sense electrode structures defined on said substrate about said ring; and
    a first amplifier having an input coupled to at least some of said number of sense electrode structures and an output defining a first output of said motion sensor.

15. The motion sensor of claim 14 further including:
    a second pair of diametrically opposed drive electrode structures defined on said substrate about said ring and defining a second axis therethrough displaced from said first axis, said second pair of diametrically opposed drive electrode structures adapted to receive sensor drive signals thereat; and a second amplifier having an input coupled to at least some remaining ones of said number of sense electrode structures and an output defining a second output of said motion sensor.

16. The motion sensor of claim 15 wherein said second axis is displaced from said first axis by approximately 45 degrees.

17. The motion sensor of claim 15 wherein said first and second pair of drive electrode structures and said number of sense electrode structures are integrated into said substrate.

18. The motion sensor of claim 15 wherein said first and second pair of drive electrode structures and said number of sense electrode structures are disposed on said substrate.

19. A method of minimizing road vibrational effects in a motion sensor having a sensing ring supported by a substrate and a number of electrode structures defined on said substrate about said ring, the method comprising the steps of:

configuring a first pair of diametrically opposed ones of said electrode structures as a first pair of drive electrodes adapted to receive sensor drive signals thereat;

configuring a second pair of diametrically opposed ones of said electrode structures as a first pair of sense electrodes, said first pair of sense electrodes defining a first axis therethrough normal to a second axis defined through said first pair of drive electrodes; and summing sense signals produced by said first pair of sense electrodes at a first output of said motion sensor.

20. The method of claim 19 further including the steps of:

configuring a third pair of diametrically opposed ones of said electrode structures as a second pair of drive electrodes adapted to receive sensor drive signals thereat;

configuring a fourth pair of diametrically opposed ones of said electrode structures as a second pair of sense electrodes, said second pair of sense electrodes defining a third axis therethrough normal to a fourth axis defined through said second pair of drive electrodes and displaced from said first axis by approximately 45 degrees; and summing sense signals produced by said second pair of sense electrodes at a second output of said motion sensor.

* * * * *